Jan. 27, 1953  C. E. PALMER  2,626,774
GATE VALVE AND VALVE OPERATING MECHANISM THEREFOR
Filed Jan. 10, 1948

INVENTOR.
CHARLES E. PALMER
BY
*Charles L. Loverheck*
ATTORNEY

Patented Jan. 27, 1953

2,626,774

UNITED STATES PATENT OFFICE 2,626,774

GATE VALVE AND VALVE OPERATING MECHANISM THEREFOR

Charles E. Palmer, Erie, Pa.

Application January 10, 1948, Serial No. 1,524

8 Claims. (Cl. 251—67)

1

This invention relates generally to gate valves, and more particularly to opposed gate valves and novel gate valve operating mechanism therefor.

In a straight flow valve with opposed, double faced expanding stop or gate valve members connected by toggle joints or linkages, the opening of the valve on the high pressure side of the valve provides no particular problem but considerable friction is set up between the low pressure seat in the valve and the low pressure valve disc on the opening thereof thereby causing excessive wear on the valve seat and the valve disc wherein leakage results and frequent replacement and repair is necessary. Before the low pressure valve disc opens on the opening of the valve, it has been found that there is a certain amount of lateral sliding movement between the low pressure valve disc and the low pressure seat. Furthermore, there is a tendency of the high pressure valve disc to open a greater amount than the low pressure valve disc thereby further increasing the difficulty in opening the low pressure valve disc because of the pressure of the fluid thereon. No means has heretofore been provided to take up the jolt caused by the opening of the valve discs, with the result that all of the pressure has been directed towards the low pressure valve disc causing considerable friction between it and its seat. Flat guiding rollers have been tried for guiding the vertical movement of the opposed valve discs and linkages when they are raised in the valve body but no provision has been provided for taking the side thrust and the end thrust of the shafts upon which the rollers are mounted and which carry the links and engaging valve discs. Toggle links heretofore used have been found inadequate in that the valve discs were imperfectly seated on the valve seats causing excessive wear at particular points in the valve discs and seats thereby causing leakage and inefficiency.

It is, accordingly, an object of my invention to overcome the above and other defects in a valve having oppositely disposed valve discs and operating mechanism therefor and it is more particularly an object of my invention to provide such a valve and operating mechanism therefor which is simple in construction, economical in cost, efficient in operation, economical in manufacture and easy to operate.

Another object of my invention is to provide a valve operating mechanism for opposed valve discs in a gate valve which will move opposing gates from their seats simultaneously while friction resulting from the application of line pressure on one of the valve discs is transferred to

2 tapered rollers mounted upon operating yokes and guided vertically in guiding channels.

Another object of my invention is to provide operating mechanism for opposed valve discs in a gate valve to reduce valve leakage and resultant valve maintenance due to wear on the low pressure seat and valve disc normally caused by the sliding withdrawal of the low pressure valve disc from its seat.

Other objects of my invention will become evident from the following detailed description, taken in conjunction with the accompanying drawings, in which Fig. 1 is a vertical sectional view taken through my novel gate valve;

Figure 1:
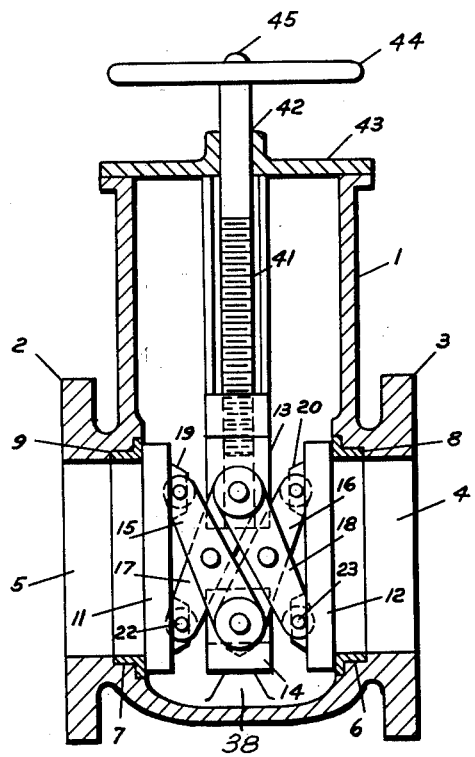
Figure 2:
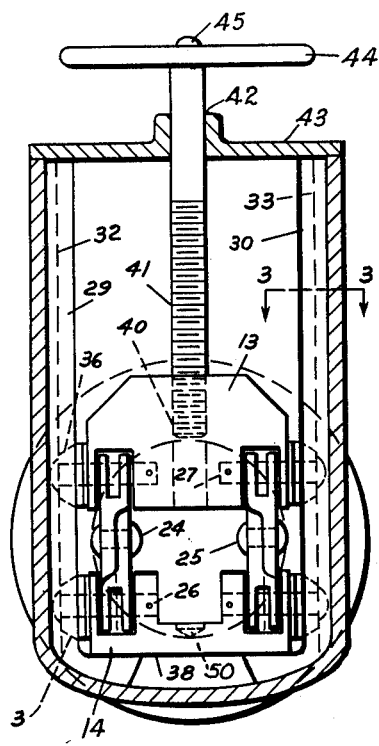
Fig. 2 is a vertical sectional view of my novel gate valve taken at right angles to the sectional view shown in Fig. 1.
Figure 3:
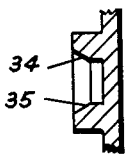
Fig. 3 is a fragmentary view taken on the line 3—3 of Fig. 2.

Referring now to the drawings, I show in Figs. 1 and 2 a valve body 1 having aligned opposed flanges 2 and 3 for connection to and in a pipe line. Either of the aligned apertures 4 and 5 in the body 1 may be an inlet or an outlet as desired. L-shaped counterbores 6 and 7 are formed in the apertures 5 and 6 for receiving inserts 8 and 9 forming valve seats. Valve discs 11 and 12 are connected to yokes 13 and 14 movable axially relative to each other by links 15, 16, 17 and 18. The links 15, 16, 17 and 18 are connected to apertured ears 19 and 20 on the valve discs 12 and 11 by pins 22 and 23. The links 15 and 17 and 16 and 18 are pivoted centrally thereof by pivot pins 24 and 25. It will thus be seen that the links 15, 16, 17 and 18 and the valve discs 11 and 12 form a linkage system in which the valve discs 11 and 12 are always parallel to each other. The links 15 and 16 are pivoted on shafts 26 journalled in yoke 14 and links 17 and 18 are pivoted on shafts 27 journalled in yoke 13. Opposed, vertically extending guide channels 29 and 30 are disposed in the body 1, the guide channels 29 and 30 each having a groove 32 and 33 with tapered sides 34 and 35 (Fig. 3) to engage the sides of tapered rollers 36 and 37 on the shafts 26 and 27. A seat 38 is provided in the lower portion of the body 1 to seat the yoke 14 as shown in Figs. 1 and 2. The yoke 13 has a centrally disposed, vertically extending threaded aperture 40 for threadably engaging threaded stem 41 which extends upwardly through aperture 42 in cover 43 on the upper end of the body 1. A suitable handle 44 is secured to the end of the stem 41 by a screw 45. For the purposes of illustration only, I have shown a non-rising stem 41 for raising the yokes 13 and 14 and the associated linkages but it will be evident that a rising stem may be used and hydraulically operated stems may also be used instead of the threaded stems as shown.

In operation, the closed valve shown in Figs. 1 and 2 is opened by turning the handle 44 thereby causing the yoke 13 to rise on the stem 41. The pressure of the yoke 14 against the seat 38 is also released by rotation of the stem 41. Line pressure applied to either one of the valve discs 11 or 12 forces it inwardly away from its seat. The links 15, 16, 17 and 18 simultaneously moves the opposite valve disc 11 or 12 in unison with the valve disc 11 or 12 on the high pressure side, the movement of the valve discs 11 and 12 inwardly being identically equal to the distance developed between the valve disc 11 or 12 on the high pressure side and its associated seat. The outer ends of the links 16 and 18 are pivotally connected to the upper and lower inner side of the gate 12, the outer ends of the links 15 and 17 are pivotally connected to the upper and lower inner side of the gate 11, the inner ends of the links 15 and 16 and 17 and 18 are pivotally connected to the axially movable yokes 13 and 14 respectively, and the links 15 and 17 and 16 and 18, respectively, are pivoted intermediate thereof so that the gates 11 and 12 move toward and away from each other in parallel relationship at all times inasmuch as the links 15, 16, 17, and 18 are of equal length and maintain equal angles therebetween on opposite sides of the central pivot points. As the stem 41 is rotated further, the valve discs 11 and 12 continue to move away from seats 8 and 9 until the links 15, 16, 17 and 18 engage each other and the yokes 13 and 14, thereby stopping any further inward movement of the valve discs 11 and 12. The yokes 13 and 14, the links 15, 16, 17 and 18, and the valve discs 11 and 12 attached thereto, then move upwardly upon continued rotation of the valve stem 41 into the body 1 of the valve and out of line with the aligned apertures 4 and 5 in the bottom of the valve body 1. The yoke 13 moves upwardly until the recess 50 in the upper side of the yoke 14 engages the end of the valve stem 41. The vertical guiding movement of the yokes 13 and 14 and all thrusts thereon are taken care of by the tapered rollers 36 and 37 engaging the tapered sides 34 and 35 of the grooves 32 and 33 in the guide channels 29 and 30.

In moving from an open position to a closed position, the handle 44 is rotated in a counterclockwise direction thereby forcing the yokes 13 and 14 with associated links 15, 16, 17 and 18 and valve discs 11 and 12 downwardly wherein the flow on the high pressure side of the body 1 forces the valve discs 11 and 12 inwardly. This inward movement of the valve discs 11 and 12 keeps them both retracted thereby clearing the seats 8 and 9 during the downward movement thereof. Continued rotation of the stem 41 by handle 44 lowers the valve discs 11 and 12 and yokes 13 and 14 until the bottom yoke 14 engages the seat 38 in the bottom of the valve body 1. The yoke 13 continues to be forced downwardly by the rotation of the stem 41 and the resulting pressure thereon is transmitted by the links 15, 16, 17 and 18 to valve discs 11 and 12 thereby forcing them simultaneously against the seats 8 and 9 to effect a complete closure of the valve. The yokes 13 and 14 are guided by the rollers 36 and 37 engaging the guide channels 29 and 30 and all thrusts are taken by the rollers 36 and 37 and guide channels 29 and 30.

It will be seen from the foregoing description that all of the side and end thrusts in my novel valve operating mechanism are taken by the tapered rollers 36 and 37 and guide channels 29 and 30. These form a very important part of my invention and make perfect seating and unseating of the valve discs 11 and 12 possible without excessive wear and friction.

Figure 4:
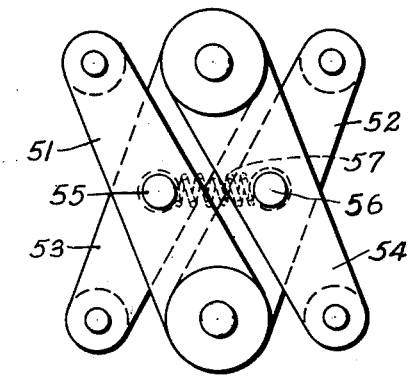
Fig. 4 is a fragmentary view of a modified form of my invention.

In Fig. 4, I have shown links 51, 52, 53 and 54 and pivot pins 55 and 56 identical with the links 15, 16, 17 and 18 and pins 24 and 25 in Fig. 1. In this modification, I connect the pins 55 and 56 by coil springs 57 to draw the links 51, 52, 53 and 54 together in fluid lines wherein very low line pressures are encountered. Springs 57 would also tend to hold the links 51, 52, 53 and 54 and their associated yokes and valve discs rigid when the valve is left in a partially opened or closed position.

One of the principal advantages of my novel valve and operating mechanism therefor, is that it may be operated with equal ease in any position; that is, in an upside down position or in a vertical position, in an angular position, or in any other position desired, without increasing the difficulty in the operation thereof or decreasing the efficiency of the valve. The rollers 36 and 37 have only sufficient clearance between the tapered sides 34 and 35 of the grooved portions 32 and 33 of the channels 29 and 30 to move without touching both sides of the grooves so that as pressure is applied to one valve disc or the other, regardless of position, the tapered rollers will tend to ascend in the guiding channels 29 and 30 thereby reducing friction.

It will be evident from the foregoing description that I have provided a novel gate valve having opposed gates or valve discs with linkages to move them simultaneously in either direction and I have further provided means in such a valve to provide means other than the valve discs and linkages to take up the lateral thrusts caused by the difference in pressure on the high pressure side of the valve and the low pressure side of the valve.

Various changes may be made in the specific embodiment of my invention without departing from the spirit thereof or from the scope of the appended claims.

What I claim is:

1. A gate valve comprising a cylindrical valve body having laterally extending, opposed, aligned apertures defining an inlet and an outlet for fluid, opposed, parallel valve disks adapted to sealingly engage said inlet and said outlet, axially spaced, relatively movable yokes in said cylindrical body, parallel cross links spaced from each other laterally and engaging the upper and lower portions of the inner sides of each of said valve disks, the inner ends of each of said cross links being connected to said upper and said lower yoke, opposed guiding members on the inner side of said valve body having vertically extending, grooved guide channels with tapered sides, tapered rollers carried by said yokes and movable in said tapered grooves in said guiding channels, and means for moving said yokes vertically.

2. A gate valve comprising an elongated valve body having laterally extending, opposed, aligned apertures defining an inlet and an outlet for fluid, opposed valve disks adapted to sealingly engage said inlet and said outlet having inwardly extending, axially spaced lugs, axially aligned yokes disposed between said valve disks movable axially relative to each other, cross links having the outer ends thereof pivotally connected to said opposite axially spaced lugs on the inner side of said valve disks and the inner ends to said yokes, the links connected to the lugs on one side of said disks being connected to the more remote yoke and the links connected to the lugs on the opposite side of said disks being likewise connected to the more remote yoke, means for pivotally connecting overlapping links intermediate thereof whereby said valve disks move inwardly and outwardly in parallel relationship simultaneously upon relative movement of said yokes, tapered rollers carried on opposite sides of each of said yokes, guiding channels having tapered grooves for engaging said rollers, and means for moving said yokes and associated links and valve disks vertically in said body out of the path of said inlet and said outlet.

3. A gate valve comprising an elongated cylindrical body having aligned apertures defining an inlet and an outlet, opposed, relatively movable valve members for sealingly engaging said inlet and said outlet, axially aligned yokes disposed between said valve members and movable axially of said body, cross link members hingedly connected together intermediate each other on the outer ends thereof to said valve members and on the inner ends thereof to said yokes whereby said valve members move relative to each other in parallel relationship, tapered roller members carried by said yokes, opposed, vertically extending guide members with tapered grooves for engaging said roller members, and means connected to said yokes for moving said yokes, cross link members, and valve members vertically out of the path of the flow of fluid through said inlet and outlet of said valve body.

4. A gate valve as set forth in claim 3 wherein spring members connect said cross link members intermediate thereof whereby they are urged to a retracted position.

5. A gate valve as set forth in claim 3 wherein a seat is provided in the end of said valve body for seating the yoke adjacent thereto.

6. A gate valve as set forth in claim 3 wherein there is a comparatively small clearance between said rollers and the tapered grooves in said guide members.

7. A gate valve comprising a cylindrical body having aligned apertures normal to the axis thereof defining an inlet and an outlet, relatively movable, opposed valve members for sealing said apertures simultaneously, axially aligned yokes axially movable in said body and relative to each other disposed between said valve members, cross link members having one end thereof connected to axially spaced points on the inner sides of said valve members and the opposite ends thereof to said yokes, pins connecting links crossing each other intermediate thereof being in parallel relationship with each other whereby said valve members move in unison and in parallel relationship upon relative axial movement of said yokes, spring members connected to said pins for retracting said valve members, a seat in the end of said body for seating the yoke adjacent thereto, means connected to the yoke remote from said seat for moving said yokes relative to each other and axially of said body, tapered rollers carried by said yokes, and channels having tapered grooves opposed to each other and extending axially of said body for engagement by said tapered rollers for taking longitudinal and lateral thrusts thereon.

8. A gate valve as set forth in claim 7 wherein said means for taking longitudinal and lateral thrusts of said yokes comprises tapered rollers carried by said yokes and vertically extending, opposed channels in said body with tapered grooves for engagement with said rollers.

CHARLES E. PALMER.

REFERENCES CITED

The following references are of record in the file of this patent:

UNITED STATES PATENTS

| Number | Name | Date |
|---|---|---|
| 869,525 | Schutte | Oct. 29, 1907 |
| 961,594 | Fischer | June 14, 1910 |

FOREIGN PATENTS

| Number | Country | Date |
|---|---|---|
| 2,080 | Great Britain | of 1904 |
| 4,154 | Great Britain | of 1897 |
| 12,715 | Great Britain | of 1893 |